United States Patent
Anders

(10) Patent No.: US 9,384,758 B2
(45) Date of Patent: Jul. 5, 2016

(54) DERIVATION OF PROBABILISTIC SCORE FOR AUDIO SEQUENCE ALIGNMENT

(71) Applicant: Google Inc., Mountain View, CA (US)

(72) Inventor: Pedro Gonnet Anders, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/754,539

(22) Filed: Jun. 29, 2015

(65) Prior Publication Data

US 2015/0380004 A1 Dec. 31, 2015

Related U.S. Application Data

(60) Provisional application No. 62/018,635, filed on Jun. 29, 2014.

(51) Int. Cl.
*G10L 19/12* (2013.01)
*G10L 25/51* (2013.01)

(52) U.S. Cl.
CPC ..................................... *G10L 25/51* (2013.01)

(58) Field of Classification Search
CPC ..................................................... G10L 25/51
USPC .............. 704/222, 237, 239, 240, 243, 256.8, 704/218
See application file for complete search history.

(56) References Cited

U.S. PATENT DOCUMENTS

| 7,010,483 B2* | 3/2006 | Rajan ...................... G10L 25/69 704/228 |
| 8,655,655 B2* | 2/2014 | Wang ...................... G10L 15/10 704/216 |

(Continued)

FOREIGN PATENT DOCUMENTS

WO WO 2014/096832 A1 6/2014

OTHER PUBLICATIONS

"Beta Distribution", Wikipedia, The Free Encyclopedia, [accessed Mar. 31, 2014], URL <https://en.wild edia.or /wiki/Betadistribution>.*

(Continued)

*Primary Examiner* — Marcellus Augustin
(74) *Attorney, Agent, or Firm* — Fenwick & West LLP

(57) ABSTRACT

A match score provides a semantically-meaningful quantification of the aural similarity of two chromae from two corresponding audio sequences. The match score can be applied to the chroma pairs of two corresponding audio sequences, and is independent of the lengths of the sequences, thereby permitting comparisons of matches across subsequences of different length. Accordingly, a single cutoff match score to identify "good" audio subsequence matches can be determined and has both good precision and good recall metrics. A function for determining the match score is determined by establishing a function $P_M$ indicating probabilities that chroma correspondence scores indicate semantic correspondences, and a function $P_R$ indicating probabilities that chroma correspondence scores indicate random correspondences, repeatedly updating $P_M$ and the match function based on existing values of $P_M$ and the match function as applied to audio subsequences with known semantic correspondences.

17 Claims, 8 Drawing Sheets

(56) References Cited

U.S. PATENT DOCUMENTS

| | | | | |
|---|---|---|---|---|
| 2010/0217593 A1* | 8/2010 | Shields | ................. | G10L 15/144 704/245 |
| 2011/0036231 A1* | 2/2011 | Nakadai | ................. | G10H 1/361 84/477 R |
| 2011/0314995 A1* | 12/2011 | Lyon | ................. | G06F 17/30743 84/609 |

OTHER PUBLICATIONS

"Beta Distribution", *Wikipedia, The Free Encyclopedia*, [accessed Mar. 31, 2014], URL<https://en.wikipedia.org/wiki/Beta_distribution>.

"Gap Penalty: Affine", *Wikipedia, The Free Encyclopedia*, [accessed Mar. 31, 2014], URL<https://en.wikipedia.org/wiki/Gap_penalty#Affine>.

Hu, N. et al., "Polyphonic Audio Matching and Alignment for Music Retrieval," *2003 IEEE Workshop on Applications of Signal Processing to Audio and Acoustics*, Oct. 19-22, 2003, pp. 185-188.

Izmirli, O., "Tonal Similarity from Audio Using a Template Based Attractor Model," International Symposium on Music Information Retrieval, 2005, pp. 540-545.

Izmirli, O., "Understanding Features and Distance Functions for Music Sequence Alignment," *11th International Society for Music Information Retrieval Conference (ISMIR 2010)*, Aug. 9-13, 2010, pp. 411-416.

Muller, M. et al., "Audio Matching via Chroma-Based Statistical Features," *$6^{th}$ International Conference on Music Information Retrieval (ISMIRE 2005)*, Sep. 11-15, 2005, pp. 288-295.

PCT International Search Report and Written Opinion, PCT Application No. PCT/US2015/038352, Sep. 22, 2015, ten pages.

"Point Accepted Mutation: Construction of PAM Matricies", *Wikipedia, The Free Encyclopedia*, [accessed Mar. 31, 2014], URL<http://en.wikipedia.org/wiki/Point_accepted_mutation#Construction_of_PAM_matrices>.

"Smith-Waterman Algorithm", *Wikipedia, The Free Encyclopedia*, [accessed Mar. 31, 2014], URL<http://en.wikipedia.org/wiki/Smith%E2%80%93Waterman_algorithm>.

Yang, C., "Music Database Retrieval Based on Spectral Similarity," International Symposium on Music Information Retrieval, Bloomington, IN, Oct. 2001, nine pages.

* cited by examiner

Sequence$_A$ 201

| | H$_{0,0}$ | H$_{1,0}$ | H$_{2,0}$ | H$_{3,0}$ | H$_{4,0}$ | H$_{5,0}$ | H$_{6,0}$ | H$_{7,0}$ |
|---|---|---|---|---|---|---|---|---|
| S e q u e n c e B 202 | H$_{0,1}$ | H$_{1,1}$ | H$_{2,1}$ | H$_{3,1}$ | H$_{4,1}$ | H$_{5,1}$ | H$_{6,1}$ | H$_{7,1}$ |
| | H$_{0,2}$ | H$_{1,2}$ | H$_{2,2}$ | H$_{3,2}$ | H$_{4,2}$ | H$_{5,2}$ | H$_{6,2}$ | H$_{7,2}$ |
| | H$_{0,3}$ | H$_{1,3}$ | H$_{2,3}$ | H$_{3,3}$ | H$_{4,3}$ | H$_{5,3}$ | H$_{6,3}$ | H$_{7,3}$ |
| | H$_{0,4}$ | H$_{1,4}$ | H$_{2,4}$ | H$_{3,4}$ | H$_{4,4}$ | H$_{5,4}$ | H$_{6,4}$ | H$_{7,4}$ |
| | H$_{0,5}$ | H$_{1,5}$ | H$_{2,5}$ | H$_{3,5}$ | H$_{4,5}$ | H$_{5,5}$ | H$_{6,5}$ | H$_{7,5}$ |
| | H$_{0,6}$ | H$_{1,6}$ | H$_{2,6}$ | H$_{3,6}$ | H$_{4,6}$ | H$_{5,6}$ | H$_{6,6}$ | H$_{7,6}$ |
| | H$_{0,7}$ | H$_{1,7}$ | H$_{2,7}$ | H$_{3,7}$ | H$_{4,7}$ | H$_{5,7}$ | H$_{6,7}$ | H$_{7,7}$ |

DERIVATION OF PROBABILISTIC SCORE FOR AUDIO SEQUENCE ALIGNMENT

CROSS REFERENCE TO RELATED APPLICATION

The application claims the benefit of Provisional Application No. 62/018,635, filed on Jun. 29, 2014, which is hereby incorporated herein by reference.

BACKGROUND

1. Field of Art

The present invention generally relates to the field of digital audio, and more specifically, to ways of deriving a score useful for meaningfully comparing portions of digital audio.

2. Description of the Related Art

It is valuable to be able to meaningfully compare two sequences of music or other digital audio, e.g., to find matching sub-sequences within the music. To that end, it is useful to quantify the degree of correspondence of the individual units ("chromae") that make up the sequences and sub-sequences, as well as to quantify the degree of correspondence of the sub-sequence as a whole.

Conventional measures of degrees of correspondence of audio units and sub-sequences typically lack inherent meaning. For example, for some measures, a score of 3 might indicate a strong match, but for other measures, a score of 3 might indicate a weak match, with a score of 72 indicating a strong match. Similarly, conventional measures do not inherently convey how much stronger a score of 11 is than a score of 10, or how much weaker a score of 9 is than a score of 10, or whether two matches with a score of 5 represent as good a match as a single match with a score of 10. Thus, these conventional measures require additional empirical knowledge to be able to properly interpret and apply the resulting scores.

SUMMARY

In one embodiment, a computer-implemented method for matching audio sequences comprises deriving a first probability density function $P_M$ outputting a probability that an initial correspondence score for a pair of chroma vectors of an audio sequence indicates a semantic correspondence between the chroma vectors; deriving a second probability density function $P_R$ outputting a probability that the initial correspondence score for a pair of chroma vectors of an audio sequence indicates that the chroma vectors have a random correspondence; deriving, using $P_M$ and $P_R$, a match function indicating whether a given pair of chroma vectors of an audio sequence correspond semantically; obtaining a first audio sequence; comparing, using the match function, the first audio sequence with a plurality of known audio sequences; and based on the comparing, identifying a best-matching audio sequence for the first audio sequence from the known audio sequences.

In one embodiment, non-transitory computer-readable storage medium stores processor-executable instructions comprising instructions for deriving a first probability density function $P_M$ outputting a probability that an initial correspondence score for a pair of chroma vectors of an audio sequence indicates a semantic correspondence between the chroma vectors; instructions for deriving a second probability density function $P_R$ outputting a probability that the initial correspondence score for a pair of chroma vectors of an audio sequence indicates that the chroma vectors have a random correspondence; instructions for deriving, using $P_M$ and $P_R$, a match function indicating whether a given pair of chroma vectors of an audio sequence correspond semantically; instructions for obtaining a first audio sequence; instructions for comparing, using the match function, the first audio sequence with a plurality of known audio sequences; and instructions for, based on the comparing, identifying a best-matching audio sequence for the first audio sequence from the known audio sequences.

In one embodiment, a computer system for matching audio sequences comprises a computer processor and a non-transitory computer-readable storage medium storing instructions. The instructions when executed by the computer processor perform actions comprising deriving a first probability density function $P_M$ outputting a probability that an initial correspondence score for a pair of chroma vectors of an audio sequence indicates a semantic correspondence between the chroma vectors; deriving a second probability density function $P_R$ outputting a probability that the initial correspondence score for a pair of chroma vectors of an audio sequence indicates that the chroma vectors have a random correspondence; deriving, using $P_M$ and $P_R$, a match function indicating whether a given pair of chroma vectors of an audio sequence correspond semantically; obtaining a first audio sequence; comparing, using the match function, the first audio sequence with a plurality of known audio sequences; and based on the comparing, identifying a best-matching audio sequence for the first audio sequence from the known audio sequences.

BRIEF DESCRIPTION OF DRAWINGS

FIG. 4 illustrates an example set of scores produced by the pair scoring module of FIG. 3 for the two example sequences of FIGS. 2A and 2B, according to one embodiment.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
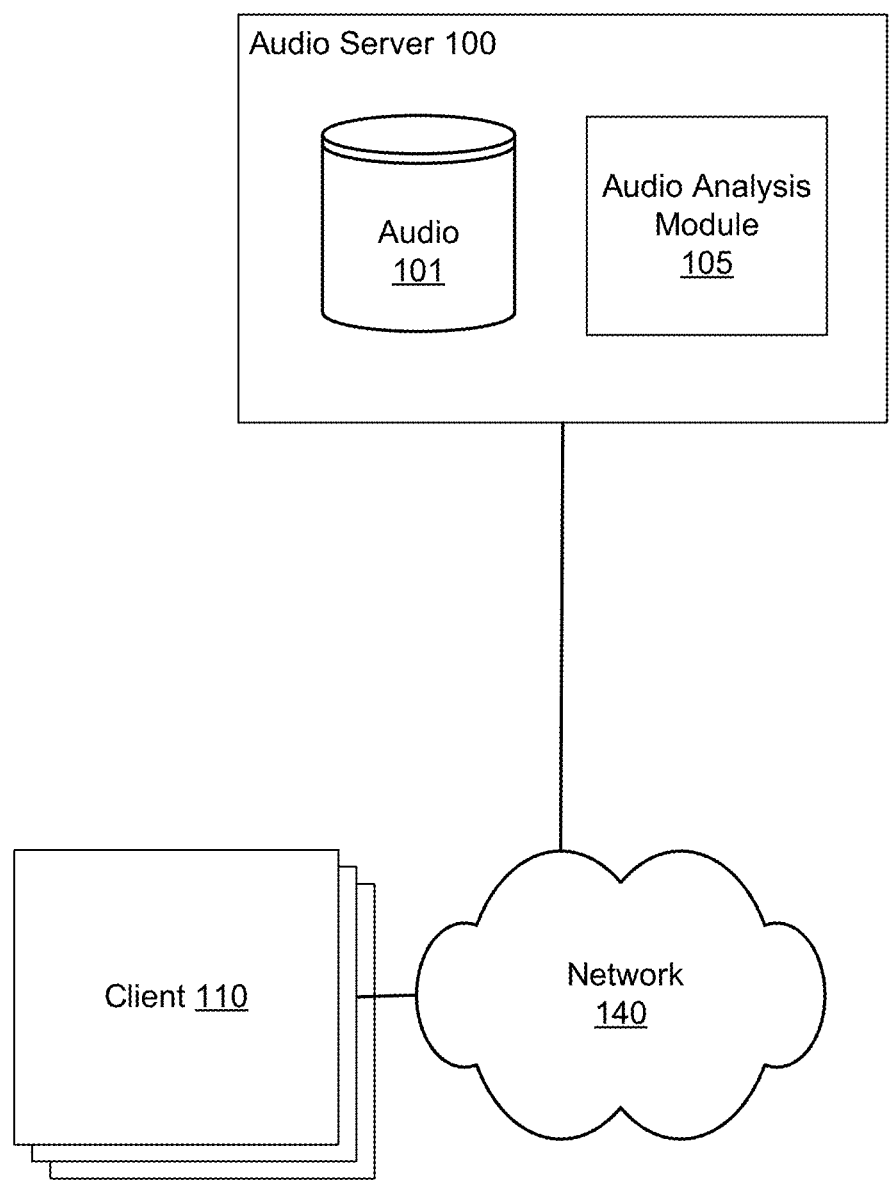
FIG. 1 illustrates a computing environment in which audio analysis takes place, according to one embodiment.

FIG. 1 illustrates a computing environment in which audio analysis takes place, according to one embodiment. An audio server 100 includes an audio repository 101 that stores a set of different digital audio sequences, such as songs, as well as an audio analysis module 105 that includes functionality to analyze and compare audio sequences. Users use client devices 110 to interact with audio, such as obtaining and playing the audio sequences from the audio repository 101, submitting queries for audio sequences, submitting audio sequences to the audio repository, and the like.

The audio server 100 and the clients 110 are connected via a network 140. The network 140 may be any suitable communications network for data transmission. The network 140 uses standard communications technologies and/or protocols and can include the Internet. In another embodiment, the network 140 includes custom and/or dedicated data communications technologies.

The audio sequences in the audio repository 101 can represent any type of audio, such as music or speech, and comprise metadata (e.g., title, tags, and/or description) and audio content. In one embodiment, the audio content is made up of discrete temporally-ordered units hereinafter referred to as "chromae." Each chroma corresponds to a particular time interval (e.g., a particular 50 millisecond interval) within an audio sequence and has a value for each of a set of measured frequencies. For example, in one embodiment each chroma has a floating point value for each of the 12 semitones in an octave, representing the strength of the frequency of that particular semitone during the corresponding time interval. The set of values for the different measured frequencies—e.g., the set <0.25, 1.1, 2.5, 1.0, 0.6, 0.79, 1.9, 2.3, 1.11, 4.6, 1.5, 2.0> for an embodiment measuring 12 frequencies—is referred to as the "chroma vector" for the chroma. In an alternative embodiment, the audio content is stored as a continuous signal and is dynamically converted to discrete chromae before it is analyzed by the audio analysis module 105.

Figures 2A, 2B:
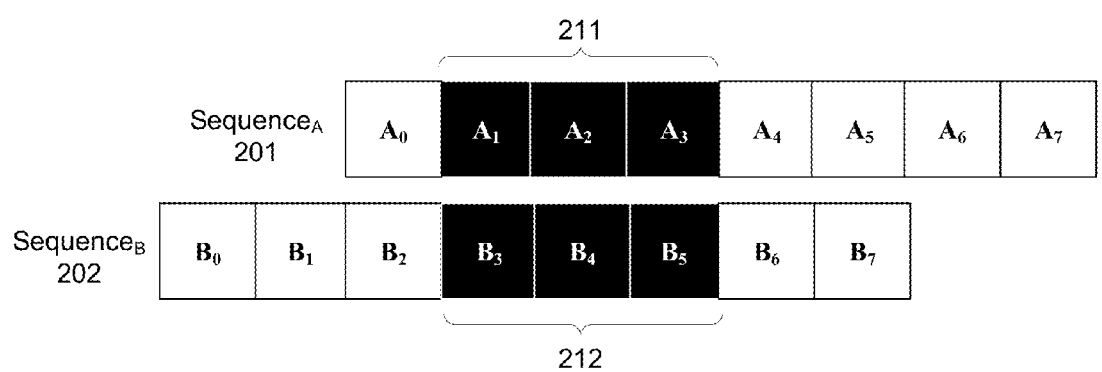
FIG. 2A illustrates one example of two different audio sequences, according to one embodiment.
FIG. 2B illustrates an example sub-sequence match, according to one embodiment.

The audio analysis module 105 analyzes the audio sequences in the audio repository 101 to determine "semantic correspondences" between pairs of audio sequences—i.e., pairs of audio sequences that are likely to sound the same to a human listener. For example, one type of analysis performed by the audio analysis module 105 is finding corresponding sub-sequences within a pair of audio sequences, visually illustrated in FIGS. 2A and 2B. FIG. 2A illustrates one example of two different audio sequences, Sequence$_A$ 201 and Sequence$_B$ 202. For simplicity of example, each sequence in FIGS. 2A and 2B consists of eight chromae ($A_0$-$A_7$ for Sequence$_A$ 201 and $B_0$-$B_7$ for Sequence$_B$ 202). It is appreciated, however, that the two sequences could have any number of chromae (e.g., 3,600, assuming a 3 minute long audio sequence and that each chromae corresponds to a 50 millisecond interval) and need not have the same number of chromae as the other. FIG. 2B illustrates an example sub-sequence match, in which chroma $A_1$-$A_3$ have been found to semantically correspond to chroma $B_3$-$B_5$, meaning that as a whole the chroma vector pairs <$A_1$, $B_3$>, <$A_2$, $B_4$>, and <$A_3$, $B_5$> have very similar values, and thus would sound alike to a human listener.

The ability to find corresponding sub-sequences within two sound sequences enables a number of applications. One application is determining whether one song is like another (e.g., due to large sub-sequences of the songs corresponding). Another application is finding a song in response to a user singing or otherwise describing a portion of the song with audio input, by attempting to find sub-sequences within known songs that semantically correspond to the audio input provided by the user.

To determine whether individual chromae—or sub-sequences of multiple chromae—semantically correspond to each other, some measure of the degree of semantic correspondence is needed. As one example, a similarity function quantifying the degree of semantic correspondence between two chromae $c_1$ and $c_2$ might be defined as $sim(c_1, c_2) = c_1 \cdot c_2 / |c_1||c_2|$. As a simplified example for the 3-element chroma vectors $c_1$=<1, 0, 1> and $c_2$=<1, 1, 0> (where the vector values are either 0 and 1 to simplify the example), the similarity score for $sim(c_1, c_2)$=<1, 0, 1>·<1, 1, 0>/|<1, 0, 1>||<1, 1, 0>|=(1*1+0*1+1*0)/[(1²+0²+1²)*(1²+1²+0²)]=1/[2*2]=¼.

However, it may be difficult to interpret the meaning of the correspondence score produced by a particular similarity function. In the example above, the score ¼ does not inherently convey whether it is a "good" score or not—that is, whether it represents a meaningful degree of semantic correspondence between the chromae (so that the chromae would likely sound alike to a human listener), as opposed to a score resulting from the chroma vector similarities that would typically occur within randomly-selected pairs of chromae. Additional empirical knowledge would be necessary to know, for example, that 0.6 is an appropriate cutoff score value that most effectively distinguishes between chroma vectors with a truly meaningful semantic correspondence and chroma vectors with merely accidental degrees of correspondence. Additional empirical knowledge would also be necessary to determine whether ten consecutive chromae matching with a score of 0.6 represents a stronger match than twelve consecutive chromae matching with a score of 0.5. In examples such as the above, where the correspondence score for even a single chroma pair fails to convey whether the correspondence is genuinely strong, it is yet more difficult to determine a meaningful correspondence score for an entire sub-sequence made up of many chromae.

Figure 3:
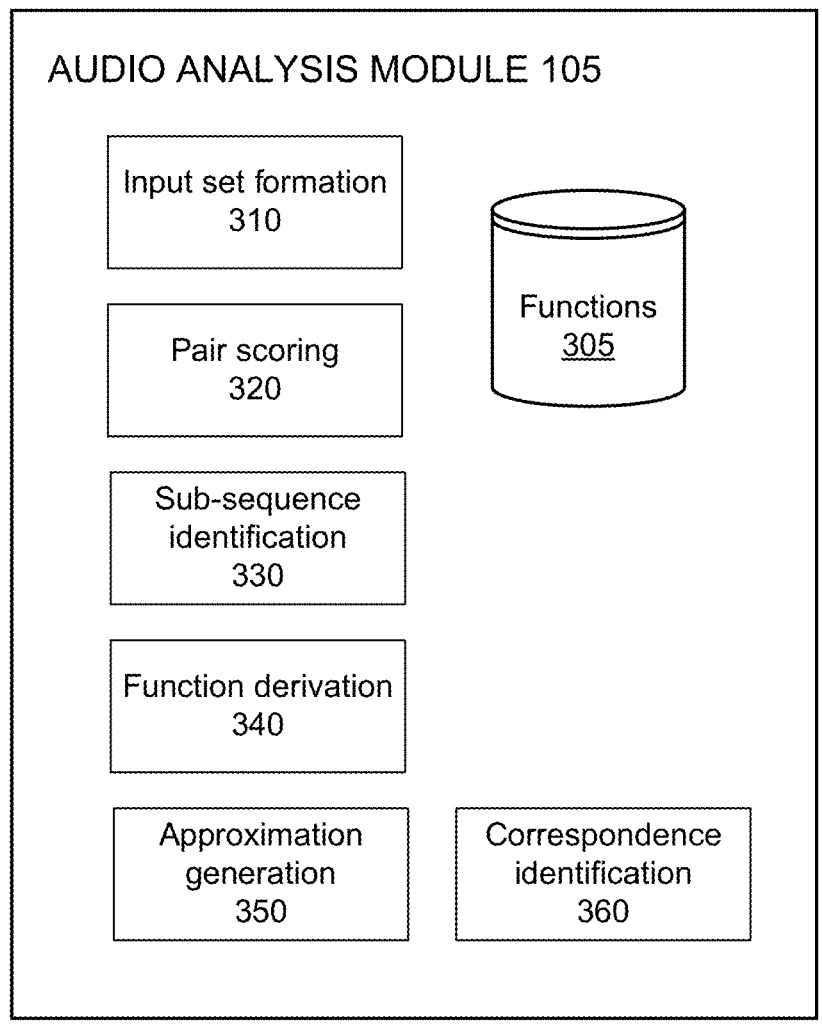
FIG. 3 is a high-level block diagram illustrating a detailed view of the audio analysis module of FIG. 1, according to one embodiment.

FIG. 3 is a high-level block diagram illustrating a detailed view of the audio analysis module 105 of FIG. 1, according to one embodiment. Using known information about genuine semantic correspondences between sub-sequences, and by comparing these semantic correspondences to the weaker correspondences inherent in randomly-selected sub-sequences, the audio analysis module 105 derives a correspondence function (hereinafter referred to as the match( ) function) applicable to chroma pairs. Intuitively, the derived correspondence function match( ) represents, for a first chroma correspondence score obtained using some initial correspondence function (such as the example function $sim(c_1, c_2)$, above), how much more likely it is that that score indicates that chromae $c_1$ and $c_2$ correspond semantically, rather than merely having accidental similarities in their chroma vectors. Thus, the semantic correspondence score produced by the derived correspondence function match( ) conveys inherent meaning without recourse to additional empirical knowledge about what the score means.

The audio analysis module 105 comprises data representing a set of functions 305 that the audio analysis module derives. The functions include a probability density function $P_M$ that maps the output of a given initial correspondence function for chroma pairs (e.g., $sim(c_1, c_2)$) to a probability that it indicates a meaningful correspondence of the two chromae. The functions further include a probability density function $P_R$ that maps the output of the given initial correspondence function to a probability that it indicates a pair of chromae selected at random/having a random correspondence, rather than having a genuine semantic correspondence. The functions also include the derived correspondence function match( ), which is in turn a function of $P_M$ and $P_R$. In one embodiment, the match( ) function is defined as $match(c_1, c_2) = \log(P_M/P_R)$.

The audio analysis module 105 comprises an input set formation module 310 that establishes sets of audio sequences that serve as input to a function derivation module 340, which derives the functions 305. Specifically, the input set formation module 310 identifies a first set $S_M$ that contains audio sequences that have been determined to have a semantic correspondence. A pair of audio sequences is said to have a semantic correspondence if the two sequences of the pair have been determined to have similar audio properties—intuitively, to sound alike. In one embodiment, the determination that audio sequences have similar audio properties is done manually, e.g., by human experts listening to the different audio sequences (e.g., songs) and determining that they sound alike.

The input set formation module 310 also forms a set $S_R$ that contains audio sequences that the input set formation module selects at random from the audio repository 101. Thus, unlike the sequences within set $S_M$, the sequences within set $S_R$ have not been determined to semantically correspond, and likely do not semantically correspond.

The audio analysis module 105 further comprises pair scoring module 320 that generates, for any two audio sequences, scores for the various possible chroma pairs between the first and second sequences. The scores are produced by the current state of the derived correspondence function match( ), which is in turn a function of $P_M$ and $P_R$. For example, FIG. 4 illustrates an example set of scores produced by the pair scoring module 320 for the two example sequences of FIGS. 2A and 2B (i.e., Sequence$_A$ 201 and Sequence$_B$ 202), both of which have 8 chromae. Accordingly, the pair scoring module 320 produces a set of 8*8=64 scores, which may be visualized as illustrated in the grid of FIG. 4, where the element $H_{i,j}$ represents the score output by match $(c_i, c_j)$, where $c_i$ is the $i^{th}$ chroma vector in Sequence$_A$ 401, and $c_j$ is the $j^{th}$ chroma vector in Sequence$_B$ 402.

The audio analysis module 105 further comprises a sub-sequence identification module 330 that takes as input the set of pair scores produced by the pair scoring module 320 for a pair of chromae. Based on the pair scores, the sub-sequence identification module 330 identifies the sub-sequences that most strongly have a semantic correspondence, based on the degrees of semantic correspondence of their constituent chromae. For example, given the sample set of pair scores illustrated in FIG. 4, the sub-sequence identification module 330 might identify the sub-sequences $A_1$-$A_3$ and $B_3$-$B_5$ as having a semantic correspondence, based on the sum of the corresponding match( ) scores $H_{1,3}$, $H_{2,4}$, and $H_{3,5}$ being relatively higher than those of other sub-sequences.

In one embodiment, the sub-sequence identification module 330 uses a dynamic programming algorithm with affine gap penalties to identify the set of consecutive chromae in both sequences having the maximum match( ) score sums.

The audio analysis module 105 further comprises a function derivation module 340 that derives the functions $P_M$, $P_R$, and match( ) from the input sets produced by the input set formation module 310. The function derivation module 340 derives the function $P_R$ in a single iteration based on the values of the set $S_R$. That is, scores of the initial correspondence function (e.g., sim( )) are computed for different pairs of the randomly-selected audio sequences from $S_R$. The scores are then fit to a probability distribution (e.g., a Beta probability distribution), which then is used as the function $P_R$.

The function derivation module 340 derives the functions $P_M$ and match( ) over multiple iterations. In a first iteration, $P_M$ is set to a rough initial approximation, which is subsequently refined in later iterations. For example, in one embodiment $P_M$ is initialized as $P_M(x)=2-2x$, where x is the value output by the initial chroma correspondence function (e.g., sim($c_1, c_2$), as above), though it is appreciated that many other initial functions could equally be used. The output of the derived correspondence function, match( ), can then be computed in terms of $P_R$ and the current value of $P_M$.

In each iteration, the function derivation module 340 uses the value of the $P_R$, and the current values of $P_M$, and match( ), to further refine the $P_M$ and match( ) functions. For example, the function derivation module 340 derives a new value for $P_M$ by using the pair scoring module 320 to generate the pair scores for the pairs of known semantically-corresponding sub-sequences in the input set $S_M$. The function derivation module 340 also uses the sub-sequence identification module 330 to identify the sub-sequence of chromae that have maximum match( ) score sums. The function derivation module 340 fits the scores from the initial correspondence function (e.g., the sim( ) function from above) to a probability distribution, which serves as the new value for $P_M$.

Figure 5A:
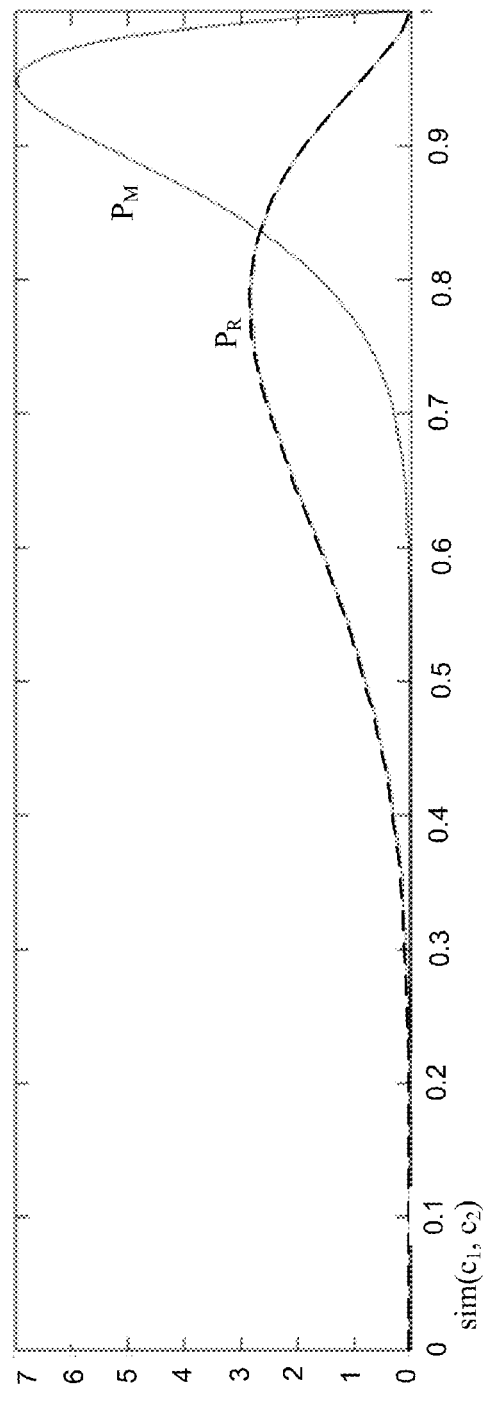
FIG. 5A illustrates sample Beta distributions for the probability density functions $P_M$ and $P_R$, according to one embodiment.

In one embodiment, the probability distribution is a Beta distribution, as illustrated in FIG. 5A, although other distributions are also possible. Specifically, FIG. 5A illustrates sample $P_M$ and $P_R$ functions for a particular similarity function (namely, sim($c_1, c_2$)=$c_1 \cdot c_2 / |c_1||c_2|$, as defined above), as modeled by Beta distribution probability density functions. The $P_M$ function—represented by a solid line—peaks for a sim( ) score of approximately 0.93, indicating that a pair of chromae with a semantic correspondence will most likely produce a sim( ) score of 0.93. The relatively low values produced by $P_M$ for sim( ) scores below 0.7 (for example) indicate that it is quite unlikely that a pair of chromae with a semantic correspondence would produce a sim( ) score less than 0.7. Similarly, the $P_R$ function peaks for a sim( ) score of approximately 0.79, meaning that the typical randomly-selected pair of chromae would produce a sim( ) score of approximately 0.79.

Figure 5B:
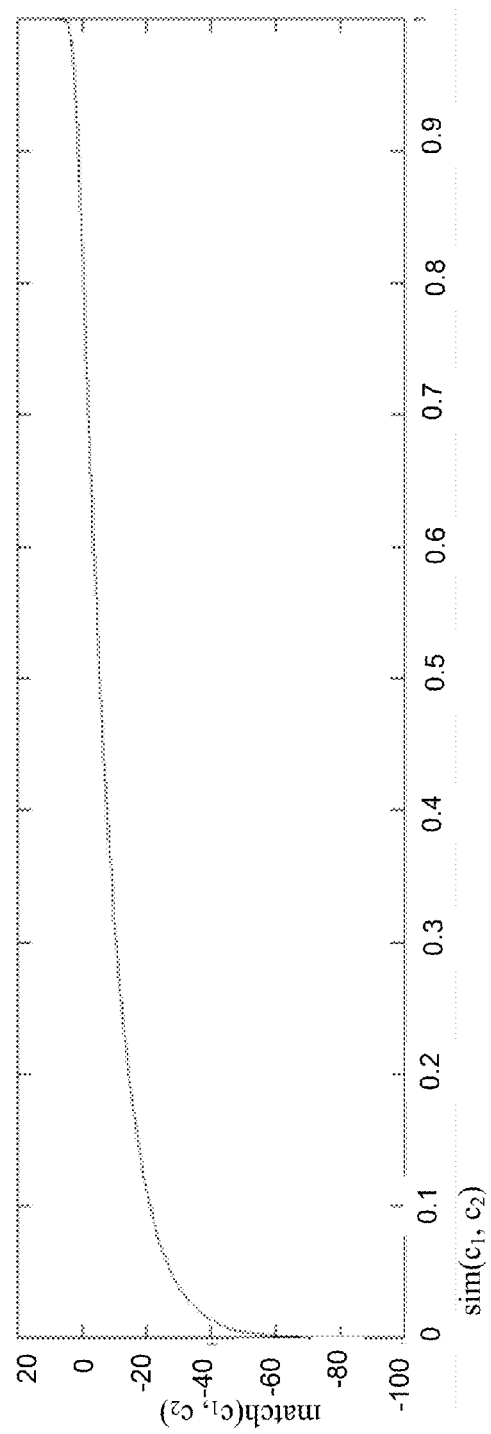
FIG. 5B illustrates a sample match( ) function corresponding to the sample $P_M$ and $P_R$ of FIG. 5A, according to one embodiment.

In one embodiment, the derived correspondence function, match( ), is defined as match($c_1, c_2$)=log ($P_M/P_R$). FIG. 5B illustrates a graph of one sample match( ) function corresponding to the sample $P_M$ and $P_R$ probability density functions of FIG. 5A.

Due to the properties of logarithms, log ($P_M/P_R$)=log $P_M$-log $P_R$. Accordingly, a match( ) score of 0 indicates that log $P_M$(sim($c_1, c_2$))=log $P_R$(sim($c_1, c_2$)), i.e., $P_M$(sim($c_1, c_2$))= $P_R$(sim($c_1, c_2$)), meaning that it is no more likely that chromae $c_1$ and $c_2$ have a semantic correspondence than that they have only the degree of correspondence that is typical of randomly-selected chromae. The sample match( ) function of FIG. 5B has the value 0 for input of approximately 0.83, the value at which the $P_M$ and $P_R$ graphs intersect in FIG. 5A.

Additionally, because of the logarithmic property that log $\Pi P_i = \Sigma$ log $P_i$—that is, the log of the probability of the events $P_i$ occurring together equals the sum of the logs of the probabilities of the events occurring individually—the sum of the scores from the derived correspondence function match( ) for a consecutive range of chroma pairs is equal to the log of the combined probability of matching over the range. Thus, a score of X for the range (i.e., the score $\Sigma$ log($P_M$(sim($c_i, c_j$))/$P_R$(sim($c_i, c_j$))) evaluated over all the pairs <$c_i, c_j$> of the range) is $e^X$ times more likely to occur in a semantically corresponding pair of sequences than in a pair of sequences selected at random. Since the match( ) score does not even depend on the number of chroma pairs in the matching range, an unbiased comparison of sub-sequences of different lengths is possible. For example, a short sub-sequence with a strong match that is equally unlikely to occur by chance as a long sub-sequence with a weak match will be assigned the same aggregate match( ) score.

Thus, since the match score for a consecutive range of chroma pairs does not depend on the length, and since therefore the matches of subsequences of different lengths can be meaningfully compared, a single range match score can be determined and applied to matches of ranges of any length, constituting a cutoff score, with scores lower than the cutoff score being considered to indicate non-matches, and scores greater than or equal to the cutoff score being considered to indicate matches. In other systems, where match scores for subsequences of different lengths cannot be meaningfully compared, a cutoff score that produces both good precision and good recall is difficult to choose. For example, for a system where in practice an average match score of 5 for chroma pairs of a subsequence of length 10 is approximately equivalent to an average match score of 3 over a subsequence of length 20, neither a cutoff of an average score of 5, nor that of a cutoff of an average score of 3, will work well for both subsequences of length 10 and subsequences of length 20. For instance, choosing a high cutoff score that produces good precision (i.e. reduces false positives), such as 5 in the example above, tends to be overly conservative and result in poor recall (i.e., fails to identify many good matches); conversely, choosing a low cutoff score that produces good recall (i.e., identifies most of the good matches), such as 3 in the example above, tends to be overly aggressive, producing poor precision (i.e., identifying many bad matches as good matches). In contrast to such other systems, since the match( ) score values described above remain consistent across subsequences of different lengths, a single cutoff can be chosen that works well for subsequences in general, regardless of subsequence length, and hence can produce good precision without sacrificing recall, and vice-versa. Accordingly, a cutoff match( ) score can be chosen—either manually and empirically, or programmatically based on a training set of subsequences with known good and bad matches—to identify "good" matches for subsequences of arbitrary length, and that cutoff score will produce favorable results with respect to both precision and recall.

Note also that the scores produced by the function match( ) are independent of the particular initial correspondence function (e.g., sim( ), above) that is employed, in the sense that the scores have the above-discussed properties regardless of which initial correspondence function is used. For example, regardless of the initial correspondence function used, a match( ) score of 0 for a pair of chromae indicates that it is no more likely that the pair has a semantic correspondence than that they were randomly selected.

The audio analysis module 105 optionally includes an approximation generation module 350, which generates functions that approximate the function match( ) and that can be computed more efficiently. For example, in one embodiment the approximation generation module 350 computes a rational interpolant function of the form $(a^n x_n + a^{n-1} x_{n-1} + \ldots + a_1 x + a_0)/(b^m x_m + b^{m-1} x_{m-1} + \ldots + b_1 x + b_0)$, where the coefficients $a^i$ and $b^j$ are the calculated parameters that define the rational interpolant function. The numerator and the denominator can be efficiently computed, given that they are defined by polynomial functions.

The audio analysis module 105 optionally includes an audio correspondence identification module 360 that identifies semantic correspondences between audio sequences. Specifically, given a first and a second audio sequence, the correspondence identification module 360 identifies the best matching sub-sequences between the two audio sequences by using the pair scoring module 320 to generate the match( ) scores between the pairs of chromae of the two audio sequences, using the final match( ) function determined by the function derivation module 340. The correspondence identification module 360 further uses the sub-sequence identification module 330 to identify the best sub-matches given the scores produced by the match( ) function. The correspondence identification module 360 can then determine whether the two audio sequences as a whole have a semantic correspondence based on the identified sub-sequences, such as the number of the identified sub-sequences, the aggregate match( ) scores of the identified sub-sequences (that is, the sum of the match( ) scores of the chroma pairs in the sub-sequence), or some combination thereof.

Figure 8:
FIG. 8 is an example user interface illustrating a matching set of song audio sequences that are found in response to the user providing sound input, according to one embodiment.

The ability to identify semantic correspondences of audio sequences as a whole permits various audio-matching operations. As one example from one embodiment, a user whistles or hums a tune, or otherwise provides verbal audio input, and the audio correspondence identification module 360 compares the audio sequence for the tune to known audio sequences in the audio repository 101, presenting the user with the best match(es) for the audio sequence as a whole, as explained above. For example, FIG. 8 is an example user interface illustrating a matching set of song audio sequences 801-804 that are found in response to the user humming into the user's device microphone input, and allowing the user to listen to those audio sequences, according to one embodiment. In a variation, the user provides non-verbal audio input, such as by uploading file containing a snippet of music to be matched against known songs. As another example from one embodiment, a system uses the audio correspondence identification module 360 to compare a given audio sequence to known copyrighted audio sequences to identify potential copyright violations. For instance, the audio server 100 itself could check a new audio sequence to be submitted to the audio repository 101 against copyrighted audio sequences already in the audio repository 101, flagging the new audio sequence if it is found to have semantic correspondence to a copyrighted audio sequence. As still another example from one embodiment, a system uses the audio correspondence identification module 360 to compare user speech to known language models in order to perform speech recognition.

Figure 6:
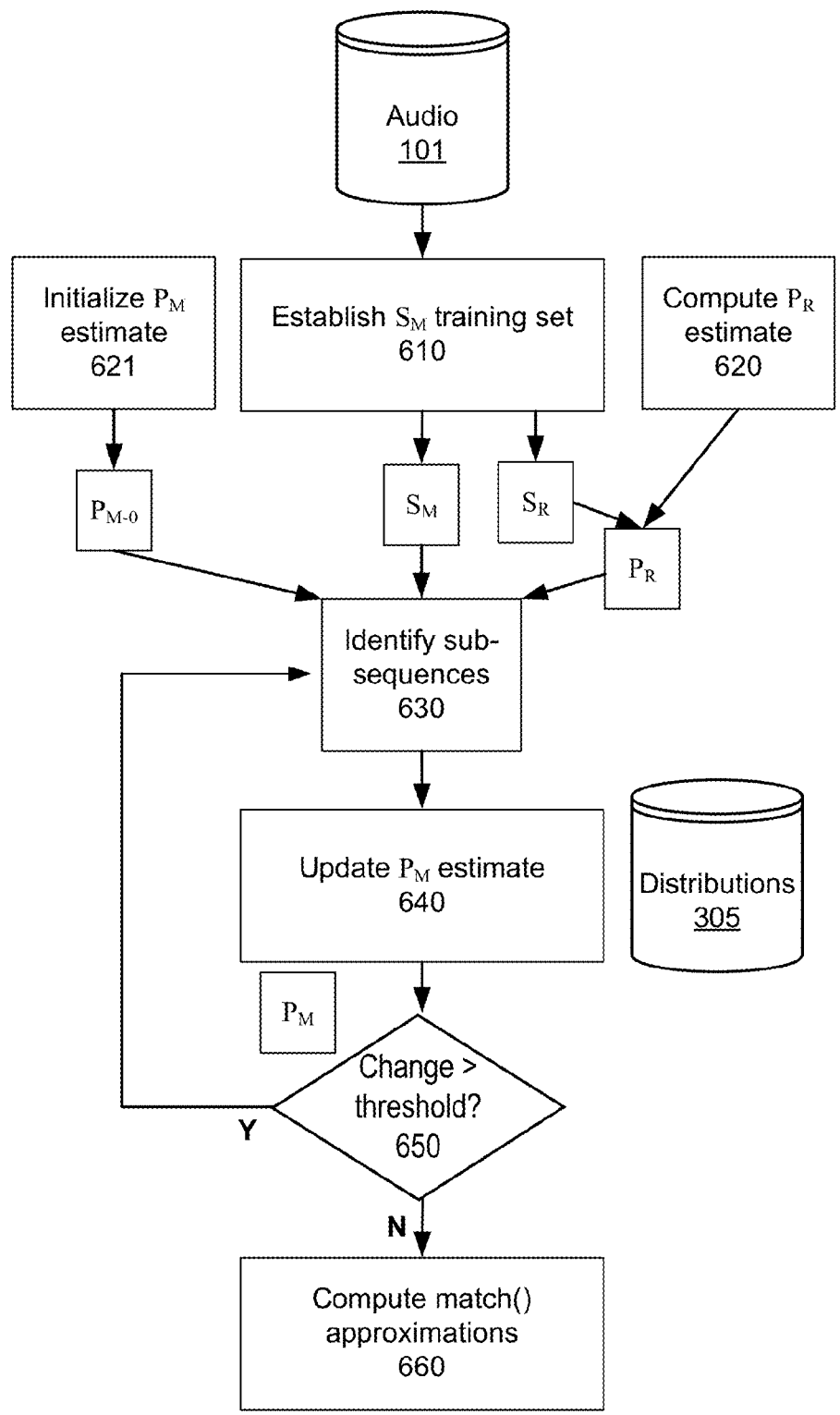
FIG. 6 is a data flow diagram illustrating the operations of the audio analysis module 105 when computing $P_M$ and $P_R$ (and the match( ) function that depends on $P_M$ and $P_R$), according to one embodiment.

FIG. 6 is a data flow diagram illustrating the operations of the audio analysis module 105 when computing $P_M$ and $P_R$ (and the match( ) function that depends on $P_M$ and $P_R$), according to one embodiment.

In step 610, the audio analysis module 105 establishes the input sets $S_M$ and $S_R$, e.g., as discussed above with respect to the input set formation module 310. The audio analysis module 105 also computes 620 the function $P_R$ based on the set $S_R$, and initializes 621 the function $P_M$, such as to the function 2−2x, as discussed above.

In order to compute a better function $P_M$, the audio analysis module 105 iteratively recomputes $P_M$ based on the current iteration's value of the derived correspondence function match( ) (which is in turn based on $P_M$ and $P_R$). This involves identifying 630 the pairs of sub-sequences of the audio sequences in $S_M$ that the match( ) function indicates have the strongest semantic correspondences. This may be accomplished as discussed above with respect to the sub-sequence identification module 330. The $P_M$ function is then updated 640 by fitting the scores produced by the initial correspondence function (e.g., sim( )) for the chromae in the identified sub-sequences to a probability density function (e.g., a Beta distribution function), e.g., as discussed above with respect to the function derivation module 340. The iteration continues until the $P_M$ function stabilizes (i.e., the change in the $P_M$ function since the prior iteration is less than a given threshold, as evaluated at step 650). The computed $P_M$ and $P_R$ functions are stored in the distributions repository 305.

Optionally, more computationally-efficient approximations to the function match( )=log ($P_M/P_R$) may also be computed 660, as described above with respect to the approximation generation module 350.

In one embodiment, sets $S_M$ and $S_R$ are formed for each of a distinct number of subsets of the audio sequences of the audio repository 101. For example, the input set formation module 310 might identify different subsets of song audio sequences based on a known musical genre of the audio sequences (e.g., Jazz, New Age, Celtic, Rap, R&B, etc.), forming a set $S_M$ and $S_R$ for each, and also performing steps 610-660 to produce functions $P_M$ and $P_R$ (and match( ) appropriate for each. The data for the appropriate subset is then used for additional analysis. For example, when attempting to identify a song audio sequence semantically corresponding to a given song, the genre of the given song is used to identify the corresponding subset, and the $P_M$ and $P_R$ (and match( )) functions appropriate for that subset are used to identify matching sub-sequences. Having genre-specific data (e.g., $S_M$, $S_R$, $P_M$, $P_R$, and match( )) allows, for example, still more accurate determinations of semantic correspondence between items known to be within a given genre.

Figure 7:
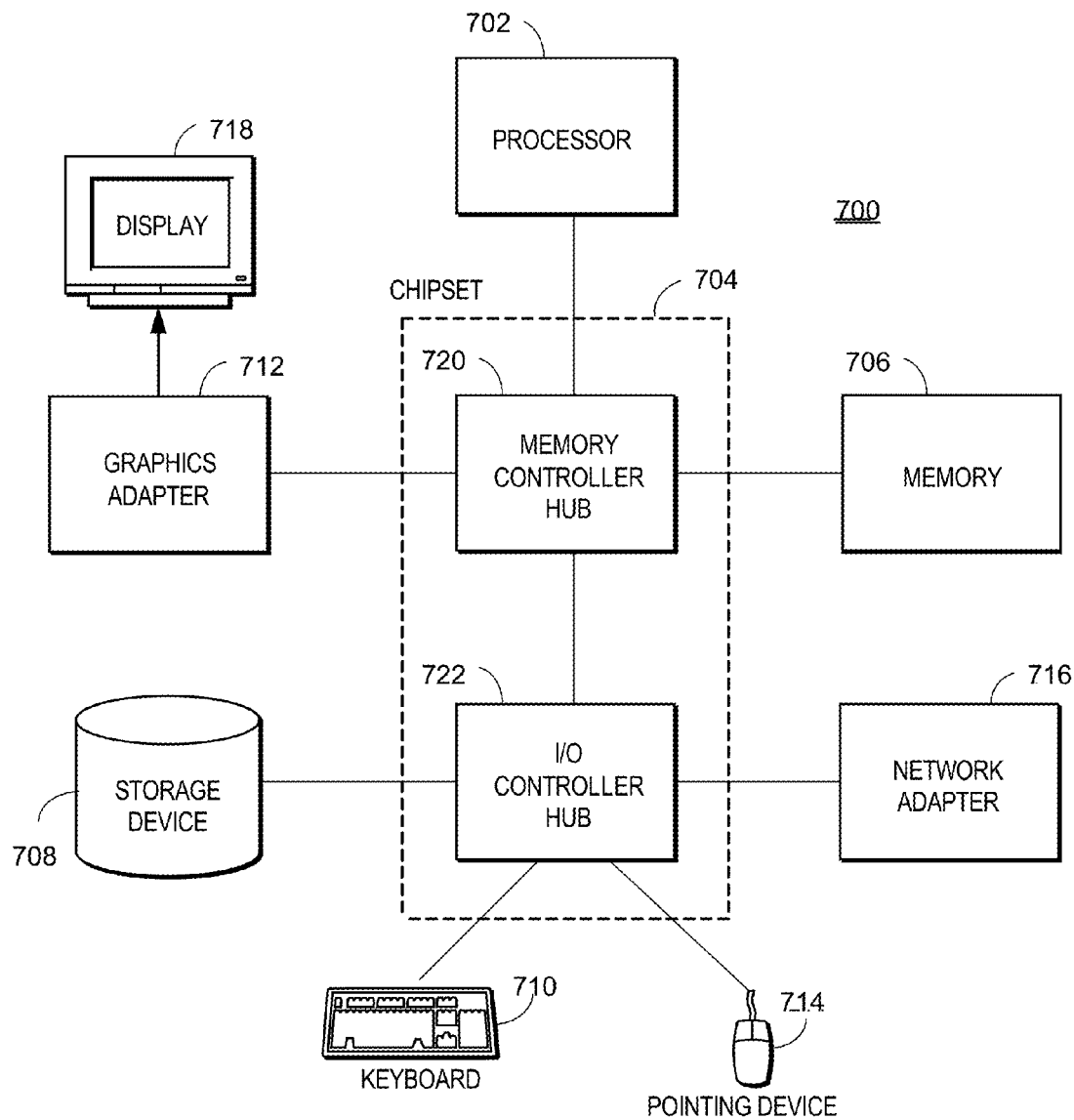
FIG. 7 is a high-level block diagram illustrating physical components of a computer 700 used as part or all of the audio server or client from FIG. 1, according to one embodiment.

FIG. 7 is a high-level block diagram illustrating physical components of a computer 700 used as part or all of the audio server 100 or client 110 from FIG. 1, according to one embodiment. Illustrated are at least one processor 702 coupled to a chipset 704. Also coupled to the chipset 704 are a memory 706, a storage device 708, a keyboard 710, a graphics adapter 712, a pointing device 714, and a network adapter 716. A display 718 is coupled to the graphics adapter 712. In one embodiment, the functionality of the chipset 704 is provided by a memory controller hub 720 and an I/O controller hub 722. In another embodiment, the memory 706 is coupled directly to the processor 702 instead of the chipset 704.

The storage device 708 is any non-transitory computer-readable storage medium, such as a hard drive, compact disk read-only memory (CD-ROM), DVD, or a solid-state memory device. The memory 706 holds instructions and data used by the processor 702. The pointing device 714 may be a mouse, track ball, or other type of pointing device, and is used in combination with the keyboard 710 to input data into the computer 700. The graphics adapter 712 displays images and other information on the display 718. The network adapter 716 couples the computer 700 to a local or wide area network.

As is known in the art, a computer 700 can have different and/or other components than those shown in FIG. 7. In addition, the computer 700 can lack certain illustrated components. In one embodiment, a computer 700 acting as a server may lack a keyboard 710, pointing device 714, graphics adapter 712, and/or display 718. Moreover, the storage device 708 can be local and/or remote from the computer 700 (such as embodied within a storage area network (SAN)).

As is known in the art, the computer 700 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 708, loaded into the memory 706, and executed by the processor 702.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A computer-implemented method for matching audio sequences, the method performed by a computer processor and comprising:
    deriving, by the computer processor, a first probability density function $P_M$ outputting a probability that an initial correspondence score for a pair of chroma vectors of an audio sequence indicates a semantic correspondence between the chroma vectors;
    deriving, by the computer processor, a second probability density function $P_R$ outputting a probability that the initial correspondence score for a pair of chroma vectors of an audio sequence indicates that the chroma vectors have a random correspondence, the deriving of $P_R$ comprising:
        randomly selecting a set of pairs of audio sequences;
        deriving initial correspondence scores for the set of pairs of audio sequences; and
        fitting the initial correspondence scores to a probability distribution;
    deriving, by the computer processor using $P_M$ and $P_R$, a match function indicating whether a given pair of chroma vectors of an audio sequence correspond semantically;
    obtaining a first audio sequence;
    comparing, by the computer processor using the match function, the first audio sequence with a plurality of known audio sequences; and
    based on the comparing, identifying, by the computer processor, a best-matching audio sequence for the first audio sequence from the known audio sequences.

2. The computer-implemented method of claim 1, wherein the match function outputs, for an initial correspondence score for the given pair of chroma vectors, an indication of how much more likely it is that the given pair of chroma vectors correspond semantically than that the given pair of chroma vectors have a random correspondence.

3. The computer-implemented method of claim 1, wherein deriving the match function comprises:
    identifying a set $S_M$ of pairs of audio sequences from audio sequences that have been determined to have a semantic correspondence;
    identifying a plurality of pairs of chroma vectors from $S_M$, a first chroma vector of the pairs from a first audio sequence of a pair from $S_M$, and a second chroma vector of the pairs from a second audio sequence of the pair from $S_M$; and
    iteratively refining the match function by:
        updating the match function based on the functions $P_M$ and $P_R$;
        computing scores for the identified plurality of pairs of chroma vectors using the match function;
        based on the scores, identifying best matching pairs of subsequences of chroma vectors; and
        updating the function $P_M$ by mapping initial correspondence scores, for pairs of chroma vectors in the best matching pairs of subsequences, to a probability distribution function.

4. The computer-implemented method of claim 1, wherein identifying the best matching pairs comprises using dynamic programming to identify sub-sequence pairs of consecutive chroma vectors in the audio sequences of $S_M$ having highest sums of scores of the match function for the chroma vector pairs within the sub-sequence pairs.

5. The computer-implemented method of claim 1, wherein an output of 0 from the match function for a pair of chroma vectors indicates that it is no more likely that the chroma vectors have a semantic correspondence than that the chroma vectors have only a degree of correspondence that is typical of randomly-selected chromae.

6. The computer-implemented method of claim 1, further comprising deriving the match function as a logarithm of a ratio of $P_M$ and $P_R$.

7. The computer-implemented method of claim 1, wherein the first audio sequence is verbal input received from a user, and the best-matching audio sequence is a song.

8. A non-transitory computer-readable storage medium for matching audio sequences, the computer-readable medium storing processor-executable instructions comprising:
    instructions for deriving a first probability density function $P_M$ outputting a probability that an initial correspondence score for a pair of chroma vectors of an audio sequence indicates a semantic correspondence between the chroma vectors;
    instructions for deriving a second probability density function $P_R$ outputting a probability that the initial correspondence score for a pair of chroma vectors of an audio sequence indicates that the chroma vectors have a random correspondence, the deriving of $P_R$ comprising:
        randomly selecting a set of pairs of audio sequences;
        deriving initial correspondence scores for the set of pairs of audio sequences; and
        fitting the initial correspondence scores to a probability distribution;
    instructions for deriving, using $P_M$ and $P_R$, a match function indicating whether a given pair of chroma vectors of an audio sequence correspond semantically;
    instructions for obtaining a first audio sequence;
    instructions for comparing, using the match function, the first audio sequence with a plurality of known audio sequences; and
    instructions for, based on the comparing, identifying a best-matching audio sequence for the first audio sequence from the known audio sequences.

9. The non-transitory computer-readable storage medium of claim 8, wherein the match function outputs, for an initial correspondence score for the given pair of chroma vectors, an indication of how much more likely it is that the given pair of chroma vectors correspond semantically than that the given pair of chroma vectors have a random correspondence.

10. The non-transitory computer-readable storage medium of claim 8, wherein deriving the match function comprises:

identifying a set $S_M$ of pairs of audio sequences from audio sequences that have been determined to have a semantic correspondence;

identifying a plurality of pairs of chroma vectors from $S_M$, a first chroma vector of the pairs from a first audio sequence of a pair from $S_M$, and a second chroma vector of the pairs from a second audio sequence of the pair from $S_M$; and iteratively refining the match function by:
  updating the match function based on the functions $P_M$ and $P_R$;
  computing scores for the identified plurality of pairs of chroma vectors using the match function;
  based on the scores, identifying best matching pairs of subsequences of chroma vectors; and
  updating the function $P_M$ by mapping initial correspondence scores, for pairs of chroma vectors in the best matching pairs of subsequences, to a probability distribution function.

11. The non-transitory computer-readable storage medium of claim 10, wherein identifying the best matching pairs comprises using dynamic programming to identify sub-sequence pairs of consecutive chroma vectors in the audio sequences of $S_M$ having highest sums of scores of the match function for the chroma vector pairs within the sub-sequence pairs.

12. The non-transitory computer-readable storage medium of claim 8, wherein an output of 0 from the match function for a pair of chroma vectors indicates that it is no more likely that the chroma vectors have a semantic correspondence than that the chroma vectors have only a degree of correspondence that is typical of randomly-selected chromae.

13. The non-transitory computer-readable storage medium of claim 8, the instructions further comprising instructions for deriving the match function as a logarithm of a ratio of $P_M$ and $P_R$.

14. The non-transitory computer-readable storage medium of claim 8, wherein the first audio sequence is verbal input received from a user, and the best-matching audio sequence is a song.

15. A computer system for matching audio sequences, the system comprising:
  a computer processor; and
  a non-transitory computer-readable storage medium storing instructions that when executed by the computer processor perform actions comprising:
    deriving a first probability density function $P_M$ outputting a probability that an initial correspondence score for a pair of chroma vectors of an audio sequence indicates a semantic correspondence between the chroma vectors;
    deriving a second probability density function $P_R$ outputting a probability that the initial correspondence score for a pair of chroma vectors of an audio sequence indicates that the chroma vectors have a random correspondence, the deriving of $P_R$ comprising;
      randomly selecting a set of pairs of audio sequences;
      deriving initial correspondence scores for the set of pairs of audio sequences; and
      fitting the initial correspondence scores to a probability distribution;
    deriving, using $P_M$ and $P_R$, a match function indicating whether a given pair of chroma vectors of an audio sequence correspond semantically;
    obtaining a first audio sequence;
    comparing, using the match function, the first audio sequence with a plurality of known audio sequences; and
    based on the comparing, identifying a best-matching audio sequence for the first audio sequence from the known audio sequences.

16. The computer system of claim 15, wherein the match function outputs, for an initial correspondence score for the given pair of chroma vectors, an indication of how much more likely it is that the given pair of chroma vectors correspond semantically than that the given pair of chroma vectors have a random correspondence.

17. The computer system of claim 15, wherein deriving the match function comprises:
  identifying a set $S_M$ of pairs of audio sequences from audio sequences that have been determined to have a semantic correspondence;
  identifying a plurality of pairs of chroma vectors from $S_M$, a first chroma vector of the pairs from a first audio sequence of a pair from $S_M$, and a second chroma vector of the pairs from a second audio sequence of the pair from $S_M$; and
  iteratively refining the match function by:
    updating the match function based on the functions $P_M$ and $P_R$;
    computing scores for the identified plurality of pairs of chroma vectors using the match function;
    based on the scores, identifying best matching pairs of subsequences of chroma vectors; and
    updating the function $P_M$ by mapping initial correspondence scores, for pairs of chroma vectors in the best matching pairs of subsequences, to a probability distribution function.

* * * * *